May 30, 1961 G. DIRKS 2,986,725

STORING DATA SIGNALS ON TAPES

Filed Aug. 28, 1958 2 Sheets-Sheet 1

INVENTOR
GERHARD DIRKS
BY Joseph Weingarten
ATTORNEY

INVENTOR
GERHARD DIRKS
BY Joseph Weingarten
ATTORNEY

United States Patent Office 2,986,725

Patented May 30, 1961

2,986,725

STORING DATA SIGNALS ON TAPES

Gerhard Dirks, 44 Mofelder Landstrasse, Frankfurt am Main, Germany

Filed Aug. 28, 1958, Ser. No. 757,732

Claims priority, application Great Britain Sept. 13, 1957

7 Claims. (Cl. 340—174.1)

This invention relates to a method and apparatus for producing an information-bearing magnetic tape and for reading information from such a tape.

It is an object of the invention to provide an improved method and apparatus for producing an information bearing magnetic tape with a plurality of information tracks.

It is a further object of the invention to provide apparatus for reading and/or recording information in a plurality of tracks arranged at an angle to the direction of feed of the tape.

According to one feature of the invention, magnetic tape transducing apparatus includes first selectively operable driving means for intermittently moving the tape in a lengthwise direction, a magnetic signal transducing device adapted to co-operate with the tape and second selectively operable driving means adapted to produce a relative reciprocatory movement between the transducing device and the tape at an angle to the lengthwise movement of the tape.

According to a further feature of the invention, magnetic tape transducing apparatus includes first driving means for intermittently moving the tape in a lengthwise direction, the tape having a plurality of parallel signal tracks arranged at an angle to the direction of tape movement, a magnetic signal transducing device adapted to co-operate with the tape, second driving means adapted to reciprocate the transducing device across the tape in a direction parallel to the signal tracks, a signal storage device adapted to operate in synchronism with said second driving means and signal transfer means adapted to effect the selective transfer of signals between the signal tracks and the storage means.

According to another feature of the invention, magnetic tape transducing apparatus includes first driving means for intermittently moving the tape in a lengthwise direction, the tape having parallel signal tracks spaced apart along the length thereof and arranged at an angle to the direction of tape movement, a first magnetic signal transducing device adapted to co-operate with the different signal tracks as the tape is moved, second driving means adapted to reciprocate the transducing device to scan a signal track, a rotatable signal storage device adapted to be driven in synchronism with said second driving means, a magnetisable signal recording surface on the storage member, a second magnetic signal transducing device associated with said surface and signal transfer means interconnecting the first and second signal transducing devices.

The invention will now be described, by way of example, with reference to the accompanying drawings, in which.

Figure 1:
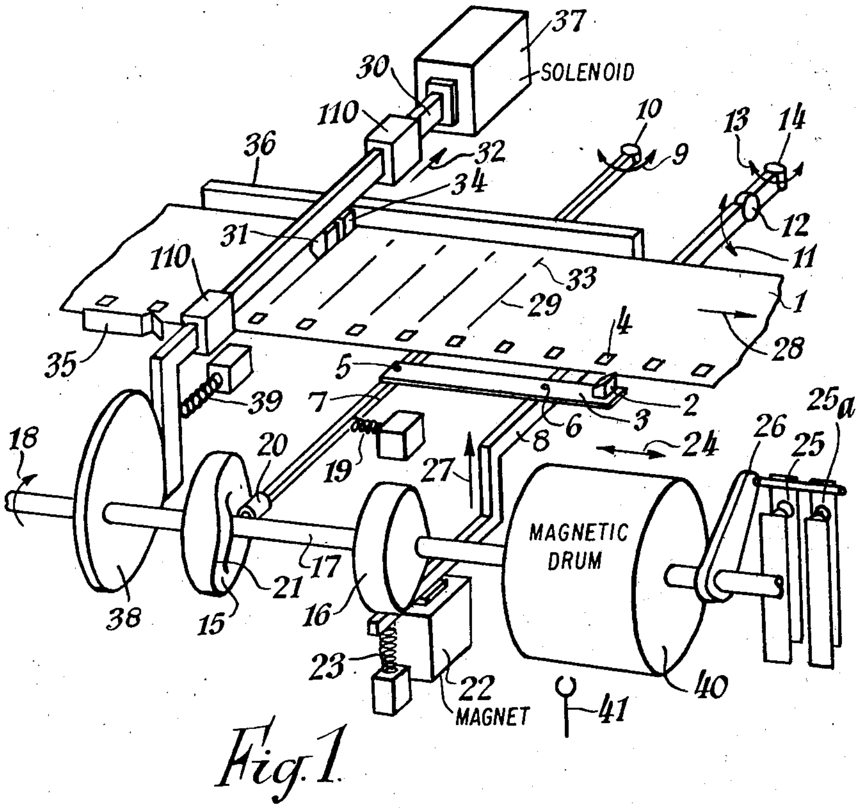
Fig. 1 is a schematic drawing of a magnetic tape driving and sensing arrangement.

A magnetic tape 1 (Fig. 1) bearing data-representing code marks is traversed in a forward direction, indicated by arrow 28, by means of a step-by-step driving mechanism actuated from a continuously rotating drive shaft 17. One edge of the tape is provided with a continuous row of sprocket holes 4. A tooth 2 mounted on a lever 3 may be engaged with a sprocket hole to drive the tape forward for a distance equal to that between two adjacent sprocket holes.

The tooth is then disengaged from the tape and is returned to its initial position in preparation for the next driving cycle. The movement of lever 3, and hence of tooth 2, is controlled by two arms 7 and 8, which are connected to lever 3 by pivots 5 and 6 respectively.

Arm 7 is free to move in a horizontal plane round a pivot 10, as indicated by an arrow 9, and is moved by means of a cam 15 secured to the shaft 17. A roller 20 on the end of arm 7 is forced into contact with a contoured face 21 of the cam by means of a compression spring 19. As cam 15 rotates, tooth 2 is reciprocated in direction of arrow 24.

The arm 8 is pivoted at points 12 and 14, so that it is free to swing in a horizontal plane and also in a vertical plane as indicated by arrows 13 and 11 respectively. Horizontal motion is imparted to the arm 8 from arm 7 via lever 3. Vertical movement is controlled by a cam 16 acting on the end of the arm 8 remote from the pivots. The arm is normally forced upwards in direction 27 into engagement with the face of the cam by a compression spring 23, but can be retained out of engagement with the cam by means of an electromagnet 22. When this magnet is energised the arm 8 is pulled downwards so that the tooth 2 is prevented from engaging a sprocket hole and no tape movement takes place. The shape of cams 15 and 16 is such that when shaft 17 rotates in the direction of arrow 18, tooth 2 engages the tape when moving forward and is disengaged from the tape when it is moving in the reverse direction so that in one revolution of the shaft the tape can be driven one step forward. De-energisation of magnet 22 is controlled by contacts 25 which are operated by a cam lever 26 secured to the shaft. The time at which contacts 25 are operated with respect to the position of cams 15 and 16 ensures that tooth 2 always enters a sprocket hole when arm 8 is released by magnet 22. The position of shaft 17 when contacts 25 are operated is regarded as the commencement of a cycle.

Alignment of the tape is effected by a guide 36 and a spring 35 which presses against one edge of the tape and keeps the other edge in contact with the guide.

Data is recorded transversely across the tape in parallel tracks 29. The distance between adjacent tracks is equal to that between adjacent sprocket holes. At the ends of the tracks remote from the sprocket holes are control marks 33 which are sensed by a head 34.

Selection of the required track 29 is effected under control of the marks 33. Shaft 17 rotates continuously and magnet 22 is normally not energised so that the tape is moved forward step-by-step and the marks 33 pass under head 34, producing a pulse in the circuit connected to the head. If the system of recording the marks 33 is such that there is a mark aligned with each of the tracks 29, the pulses from head 34 are counted and when a predetermined count is reached, identifying the required track, magnet 22 is energised and the tape halts with the selected track aligned with a reading head 31. If a mark 33 has been recorded on the selected tracks only, no counter is required and the magnet 22 is energised when an output pulse from head 34 occurs.

Head 31 which senses data on the tracks 29 is secured to a bar 30 which is supported in brackets 110 and is reciprocated transversely across the tape in alignment with a track 29 by means of a cam 38 secured to the shaft 17. Bar 30 is normally held in engagement with the cam 38 by means of a compression spring 39, but it can be retained out of engagement by energisation of a solenoid 37. The solenoid may be de-energised under control of contacts 25 so that during a single revolution of shaft 17, head 31 is traversed by cam 38 along a track 29 from the position shown to a position at the other end of the track and back again. Data on the track can thus be sensed in either direction, but in the present embodiment the output from head 31 is only utilised when the head is moving in the direction of arrow 32, that is during the second half of a cycle. This has the advantage that the movement of the head is then governed entirely by the contour of the cam 38, so that the speed of travel of the head may be made substantially uniform and is constant from scan to scan.

The data read out from track 29 is temporarily recorded on a magnetic drum 40 by means of a head 41. This permits the data to be checked before transfer to a data utilization device. Ways in which data on track 29 can be recorded, whereby various types of error can be detected, are well known and include parity checking codes and codes having a constant number of code bits. One form of parity checking circuit is described in U.S. Patent No. 2,719,959, issued October 4, 1955. In this circuit, a trigger is switched by a succession of binary data signals together with a parity signal. The trigger controls a gate which is tested at the end of a group of signals and emits a signal if the parity check is satisfied.

If after checking the data is found to be correct, magnet 37 is energised to hold bar 30 stationary and the data is transferred from the intermediate drum store to the utilization device. If, however, the data sensed from track 29 does not satisfy the check applied to it, head 31 moves a second time over the same track, and the data sensed therefrom is re-recorded on the drum, the previous recording having been erased. This is repeated until the sensed data satisfies the check.

Figure 2:
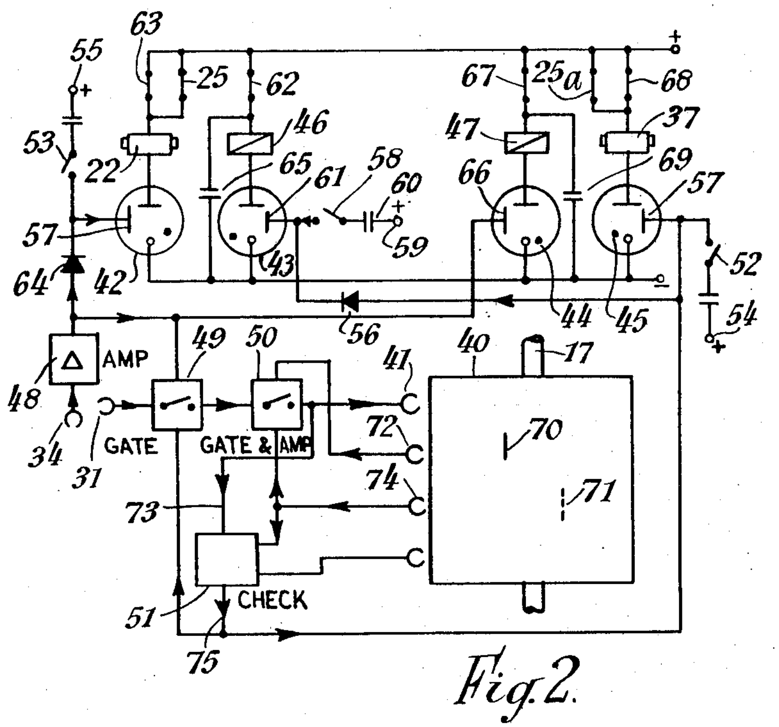
Fig. 2 is a schematic diagram of a circuit for controlling the arrangement shown in Fig. 1.

Control of magnets 22 and 37 is effected by four cold cathode gas valves 42, 43, 44 and 45 (Fig. 2). In the anode circuit of valve 42 is the magnet 22 and two parallel normally-closed contacts 25 and 63. The anode circuit of valve 45 is completed through magnet 37 and two parallel normally closed contacts 25*a* and 68. Valves 42 and 45 are fired by closing contacts 53 and 52, respectively, which permit a positive pulse to be applied, via capacitors, from an associated supply terminal 55 or 54 to igniter electrodes 57. Prior to the transfer of data from the tape, valves 42 and 45 are fired by closing contacts 53 and 52 and a motor (not shown) is energised to rotate the driving shaft 17. Magnet 22 is then de-energised to initiate tape movement. This is effected under control of valve 43 which is fired by closing contacts 58 to cause a pulse from a positive terminal 59 to be applied, via a capacitor 60, to the igniter electrode 61 of the valve. When the valve fires a relay 46 in the anode circuit is operated. This relay breaks contacts 63 in the anode circuit of valve 42 and also breaks a contact 62 in the anode circuit of valve 43. Connected between the cathode of valve 43 and the junction of relay 46 and contact 62 is a capictor 65 which discharges through the relay when the contact 62 is broken. When the anode voltage falls to a value at which the discharge in the valve can no longer be sustained, the valve de-ionises and relay 46 is released, reclosing contacts 63 and 62. The object of the capacitor 65 is to ensure that contact 63 is still open when contact 25 is opened by the cam 26. As valve 43 may be fired at any point in the cycle of shaft 17, such a delay in the release of relay 46 is clearly necessary. The duration of the delay is determined by the capacitor/relay circuit time constant. While contact 63 is still open, contact 25 is momentarily opened by the arm 26 to de-ionise valve 42, so that lever 8 is released permitting the tape to be driven forward step-by-step.

Thus the contacts 53 and 58, which may be manually or electro-magnetically operated, control the starting of the tape. After these contacts have been operated initially, the tape will continue to be fed step-by-step, since the valve 42 will not be fired to energise the magnet 22. The tape feed may be halted by the sensing of a mark 33.

When a mark 33, indicating a selected track, is sensed by head 34, the pulse from an associated amplifier 48 is applied, via a diode 64, to the electrode 57 of valve 42. This causes the valve to fire and magnet 22 is energised to halt the movement of the tape. The output from amplifier 48 is also fed to an igniter electrode 66 of valve 44 so that the valve fires. Anode current to the valve is supplied through a relay 47 and a normally closed series contact 67 controlled by the relay. When valve 44 fires the relay operates and opens contact 67, but the valve is not immediately de-ionised by virtue of a capacitor 69 which functions in the same manner as capacitor 65 to delay the release of the relay. The operation of relay 47 also breaks contact 68 so that when contact 25*a* is broken momentarily by cam 26, valve 45 is de-ionised with the result that bar 30 is released by magnet 37 to effect the sensing of track 29.

The signal transfer path between head 31 and head 41 includes two gates 49 and 50 in series. Gate 49 is opened by the output from amplifier 48 and gate 50 by a signal which occurs in the middle of the revolution cycle of drum 40. This signal is derived from a head 72 which senses a mark 70 so positioned on the drum that gate 50 is opened just as head 31 begins to travel in the direction of arrow 32. Gate 50 includes a recording amplifier so that data sensed by head 31 can be recorded on the drum by means of head 41. At the conclusion of the cycle, half a revolution later, a mark 71 on the drum is sensed by a head 74 and the resulting pulse closes gate 50. The signals applied to head 41 are also applied over a lead 73 to a checking circuit 51. If the data fed to head 41 is correct, circuit 51 passes the pulse from head 74 to a line 75 and thence to gate 49 to close it. The pulse on line 75 is also fed to electrode 57 of valve 45 and via a diode 56 to electrode 61 of valve 43 whereby both valves are fired, thus the head 31 is held stationary and a further movement of tape 1 is initiated. The gates 49 and 50 each consist of a triode amplifier, the grid bias of which is controlled by a bi-stable flip-flop. The state of the flip-flop is determined by control signals applied thereto. The amplifier is biased to an operative or an inoperative condition in dependence on the particular state assumed by the flip-flop. A detailed circuit of such a gate is shown in British Patent No. 820,115. A suitable structure for the drum 40 and the associated reading and recording circuits is also described in this British patent.

If the signals fed to head 41 do not check, no output is obtained on line 75 and head 31 moves over the same track 29 a second time. The erroneous data previously recorded on the drum by head 41 is erased by a head (not shown) or by over-recording and the result of the second sensing of the track is recorded on the drum as before.

It will be appreciated that if the method of recording tracks 29 is such that there is a mark 33 on every track, a predetermined track can be selected by introducing a pre-set counter between head 34 and amplifier 48, so that the counter gives an output only when the preselected number of marks have been sensed by head 34.

Figure 3:
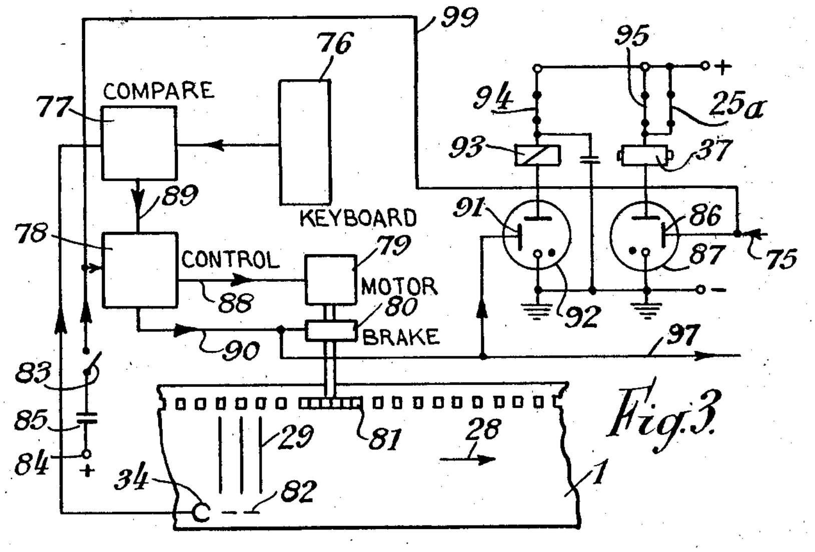
Fig. 3 is a schematic diagram of a modified control circuit.

In a second embodiment shown in Fig. 3, the magnetic tape 1 is a driven continuously during intervals between sensing by means of a sprocket wheel 81 on the shaft of a motor 79. Figure 3 shows only the modifications necessary to the tape feeding arrangements of Figure 1. The structure for traversing the head 31 and the circuits for transforming data to and from the tape are as shown in Figures 1 and 2. The speed of the motor, and hence of the tape, is controlled by a control unit over a line 88. A brake on the motor shaft holds the tape stationary while data is being sensed. In this embodiment, coded control numbers 82 are recorded between tracks 29 in a longitudinal track sensed by head 34. As the tape moves in the direction of arrow 28 the coded numbers are sensed and the resultant signals from head 34 are fed to a comparison device 77. In this device the number is compared with the number of a required track set up on a keyboard 76. The head 34 is located five tracks in advance of the head 31 (Fig. 1) which senses tracks 29, so that when the number sensed by head 34 coincides with the number entered on the keyboard 76 there is a distance equal to approximately five track intervals in which the tape can be decelerated before being finally halted with the selected track aligned with the sensing head 31.

The tracks 29 are sensed by the arrangement shown in Fig. 1, namely the cam 38, bar 30, head 31 and magnet 37.

The motor 79 is started by applying a pulse to the control unit 78 from a positive terminal 84 via a capacitor 85. This is effected by closing a contact 83. The pulse is also supplied to the igniter electrode 86 of a valve 87, over line 99 whereby the magnet 37 in the anode circuit of the valve is energised. Thus the tape is driven forward and the sensing head 31 is held stationary. When an output is obtained from the comparison device on a line 89, which is connected to the control unit 78 motor 79 is decelerated and when the selected track is aligned with head 31, the control unit applies a positive voltage to a line 90. This serves to operate the brake 80 and to fire valve 92 by reason of a connection between an igniter electrode 91 and line 90. The function of valve 92 is similar to that of valve 44; a relay 93, a contact 94 and a capacitor 96 in the anode circuit correspond to the similar components associated with valve 44. Contacts **25*a* and 95 in the anode circuit of valve 87 correspond to those referenced 25*a* and 68** in Fig. 2.

The control voltage on line 90 is also applied over a line 97, to the control input of gate 49 (Fig. 2) whereby the gate is opened. Thus when the tape is halted, the sensing head 31 is moved along the selected track 29 and the data thereon is transferred to drum 40 as already described in connection with the arrangement of Fig. 2.

The pulse on line 75 (Figs. 2 and 3) which signifies the correctness of data transfer is applied to the igniter electrode 86 (Fig. 3) of valve 87 to fire the valve and restrain movement of the head 31 (Fig. 1). The signal is also fed via line 99 (Fig. 3) to the control unit 78 to initiate further movement of the tape.

If the tape consists of standard 35 mm. film stock, coated with a suitable magnetic oxide layer, it has been found possible to record the whole of the information normally recorded on an 80 column punched record card, in each of the tracks 29. The method of recording the information in tracks lying at right angles to the direction of feed of the tape allows a particular block of information to be positioned for sensing much more rapidly than when the information is recorded in the conventional manner using lengthwise tracks, since the amount of tape to be fed is correspondingly reduced. The feed mechanism does not entail a high degree of mechanical accuracy, since the tape has to be positioned only sufficiently accurately to enable the head to sense the desired track. The simple aligning mechanism, comprising the ledge 36 and the spring 35, ensures that each track is accurately positioned with respect to the edges of the tape.

The feeding of the tape and the scanning movement of the head 31 are independently controlled. This allows the tape to be fed at a relatively high speed to bring a required track to a position in which it is sensed, whilst enabling the two movements to be mechanically synchronised and simplifying synchronisation of the temporary storage drum 40. This is particularly valuable when it is required to sense only a few tracks which are widely separated on a long length of tape. The apparatus has been described in relation to the sensing of a recorded tape, but it will be appreciated that the heads 31 and 34 may also be used as recording heads and the head 41 as a reading head by the provision of switched read/write amplifiers. Thus, an information track on the drum 40 may be read by the head 41 and the information recorded in a track 29 on the tape by the head 31. The particular track for recording may be selected under control of a mark 33, or by counting the marks 33. Alternatively, the sprocket holes may be counted, by sensing them with a photo-electric cell, for example, If the tape is initially blank the tracks 29 may be recorded in succession, the head 34 being used to record marking signals to control subsequent reading of selected tracks.

The head 31 may comprise a multiple head unit, so that each track 29 consists of two or more parallel sub-tracks. Each sub-track may be used for recording one code element of a character which is represented by a multi-element code, or for recording synchronising signals.

It will be appreciated that the length of the tracks 29 may be increased, for a given tape width, by mounting the arm 30 so that it is at 45° for example, to the direction of tape feed.

Suitable circuits for performing the gating, amplifying and comparing functions represented by individual blocks in the block diagrams are well known in the art. Typical circuits are described in detail in British Patent No. 820,115.

The tape feeding mechanism comprising the sprocket 81, brake 80, motor 79 and control unit 78 may be of a conventional kind suitable for controlled start-stop operation. One such mechanism is described in British Patent No. 711,482. The control unit for this mechanism has a start input lead and a stop input lead. The stop signals are produced by photo-electric sensing of characters from the tape. For use with present apparatus the stop signals are derived instead from the lead 89 and the start signals are derived from the lead 99.

What I claim is:

1. Magnetic tape transducing apparatus including first driving means for intermittently moving the tape step by step in a lengthwise direction, the tape having a plurality of parallel signal tracks arranged at an angle to the direction of tape movement, a magnetic signal transducing device co-operating with the tape, second driving means operable to reciprocate the transducing device across the tape in a direction parallel to the signal tracks, signal operated control means for the second driving means, the control means being responsive to each signal applied thereto to render operative the second driving means to reciprocate the transducing device once across the tape, a signal storage device operating in synchronism with said second driving means and signal transfer circuits interconnecting the transducing device and the storage device and effective to set the storage device in accordance with signals read from the tape by the transducing device during said reciprocating movement.

2. Apparatus as claimed in claim 1, in which said second driving means includes a cam and a slidable bar resiliently urged into contact with the cam by a spring, said transducing device being mounted on said bar, and an electro-magnet arranged to hold the bar out of contact with the cam when the winding of said electro-magnet is energized.

3. Apparatus as claimed in claim 2, in which the direction of movement of the transducing device is perpendicular to the direction of tape movement.

4. Magnetic tape transducing apparatus including first driving means for intermittently moving the tape in a lengthwise direction, the tape having parallel signal recording tracks spaced apart along the length thereof and arranged at an angle to the direction of tape movement, a first magnetic signal transducing device co-operating with the different signal tracks as the tape is moved, second driving means operable to reciprocate the transducing device to scan a signal track, a signal operated control circuit for the second driving means, the control circuit being responsive to each signal applied thereto to cause operation of the second driving means to reciprocate the first transducing device once across the tape, a rotatable signal storage device driven in synchronism with said second driving means, a magnetisable signal recording surface on the storage member, a second magnetic signal transducing device associated with said surface and signal transfer means interconnecting the first and second signal transducing devices.

5. Apparatus as claimed in claim 4, in which the first transducing device is reciprocated in a direction perpendicular to the length of the tape, and in which the tape is aligned with respect to one edge thereof.

6. Apparatus as claimed in claim 4, in which the tape has a further signal track arranged in the lengthwise direction of the tape, a third signal transducing device associated with said further track and means to control operation of the second driving means in dependence on signals sensed by the third transducing device.

7. Magnetic tape transducing apparatus for a tape having a first signal track arranged lengthwise of the tape and a plurality of second signal tracks arranged perpendicular to the length of the tape, including first and second magnetic reading heads co-operating with the first and second signal tracks, respectively; tape feeding means operative to feed said tape past said magnetic heads in a lengthwise direction; means responsive to signals sensed by said first magnetic head to generate a stop signal; first means responsive to said stop signal to render the tape feeding means inoperative and to halt the tape with one of the second tracks aligned with the second magnetic head; driving means operable to move the second magnetic head perpendicular to the length of the tape to read one of said second tracks aligned with said head; and second means responsive to said stop signal to render said driving means operative.

References Cited in the file of this patent

UNITED STATES PATENTS

| | | |
|---|---|---|
| 2,540,654 | Cohen | Feb. 6, 1951 |
| 2,648,589 | Hickman | Aug. 11, 1953 |
| 2,721,990 | McNaney | Oct. 25, 1955 |

Notice of Adverse Decision in Interference

In Interference No. 92,296 involving Patent No. 2,986,725, G. Dirks, Storing data signals on tapes, final judgment adverse to the patentee was rendered Dec. 6, 1962, as to claim 1.

[*Official Gazette February 5, 1963.*]